US012020668B2

(12) United States Patent
Chang et al.

(10) Patent No.: US 12,020,668 B2
(45) Date of Patent: Jun. 25, 2024

(54) IMAGE OUTPUT DEVICE AND IMAGE OUTPUT METHOD

(71) Applicant: Coretronic Corporation, Hsin-Chu (TW)

(72) Inventors: Keng-Chia Chang, Hsin-Chu (TW); Fu-Shan Wang, Hsin-Chu (TW); Li-Ming Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/525,981

(22) Filed: Nov. 15, 2021

(65) Prior Publication Data

US 2022/0165237 A1 May 26, 2022

(30) Foreign Application Priority Data

Nov. 25, 2020 (CN) ......................... 202011336204.4

(51) Int. Cl.
*G09G 5/395* (2006.01)
*G09G 5/393* (2006.01)

(52) U.S. Cl.
CPC ............. *G09G 5/395* (2013.01); *G09G 5/393* (2013.01); *G09G 2310/08* (2013.01); *G09G 2360/12* (2013.01); *G09G 2370/20* (2013.01)

(58) Field of Classification Search
CPC ........ G09G 5/393; G09G 5/395; G09G 5/399; G09G 2310/08; G09G 2360/12; G09G 2370/20; G09G 2310/0297; G06F 5/16; G06F 13/287; G06F 13/30; G06F 2207/4812
See application file for complete search history.

(56) References Cited

U.S. PATENT DOCUMENTS

2006/0022922 A1* 2/2006 Jinda .................... G09G 3/3611 345/87
2011/0222556 A1 9/2011 Shefler et al.
(Continued)

FOREIGN PATENT DOCUMENTS

CN 101923843 12/2010
CN 109561320 4/2019
(Continued)

OTHER PUBLICATIONS

"Office Action of China Counterpart Application", issued on Nov. 15, 2023, p. 1-p. 9.

*Primary Examiner* — Antonio A Caschera
(74) *Attorney, Agent, or Firm* — JCIPRNET

(57) ABSTRACT

An image output device coupled to a first and second signal source and a method thereof. The image output device includes memories configured to store frame image data respectively, a source selection circuit coupled to the first and second signal sources and the memories and configured to choose to store a first frame image data transmitted by the first or second signal source in one of the memories according to a working state of the first signal source, and an image output circuit coupled to the memories and the source selection circuit and configured to output the first frame image data stored in one of the memories. The image output device may rapidly switch to a backup signal source when the signal source is unstable to achieve fast switching and perfect connection.

23 Claims, 6 Drawing Sheets

(56) References Cited

U.S. PATENT DOCUMENTS

| | | | | |
|---|---|---|---|---|
| 2016/0203579 | A1* | 7/2016 | Griffin | G09G 5/006 345/520 |
| 2020/0294465 | A1* | 9/2020 | Ozawa | G09G 5/006 |

FOREIGN PATENT DOCUMENTS

| | | |
|---|---|---|
| CN | 111404882 | 7/2020 |
| JP | H07322091 | 12/1995 |
| JP | H0965235 | 3/1997 |
| JP | 2002158785 | 5/2002 |
| JP | 2003264753 | 9/2003 |
| JP | 2007318558 | 12/2007 |
| TW | M547798 | 8/2017 |
| TW | 201811057 | 3/2018 |

* cited by examiner

IMAGE OUTPUT DEVICE AND IMAGE OUTPUT METHOD

CROSS-REFERENCE TO RELATED APPLICATION

This application claims the priority benefit of China application serial no. 202011336204.4, filed on Nov. 25, 2020. The entirety of the above-mentioned patent application is hereby incorporated by reference herein and made a part of this specification.

BACKGROUND OF THE INVENTION

Field of the Invention

The invention relates to an image output device and an image output method, in particular to an image output device having a backup signal source and an image output method thereof.

Description of Related Art

Via the phenomenon of persistence of vision, a plurality of images may be played quickly to achieve the effect of playing continuous images. Generally speaking, the playback speed that is not easily detectable by the human eye needs to be at 24 FPS (frame per second) or more. Image signal processing is a technique of processing a large amount of continuous image data and then outputting the data rapidly. The amount of image data has a positive correlation with the resolution and FPS of the image. Since 2013, the trend of the imaging industry has been towards full 4K, and displays that support 4K UHD (full high definition) resolution have also emerged one after another. In particular, it is necessary to exchange information back and forth to complete the transmission of image data, the receiving terminal locking the image resolution of the transmitting end, and the transmission of the encryption and decryption mechanism. Once the signal source of the image data is unstable or interrupted, the signal source of the image data needs to be re-locked to restore the transmission protocol between the transmission interfaces before the content of the image signal may be outputted. In addition, the image data transmission may also be interrupted due to accidents or human factors causing the connection circuit to fall off. In this situation, the issue needs to be manually troubleshot or it may be necessary to temporarily switch to another signal source. However, no matter how fast the processing speed and the speed of restoring image transmission are, the above situation still degrades the experience of the viewer, which is undesirable in various important game broadcasts or large conferences.

Nowadays, software is largely used to realize automatic detection and switching of signal sources. However, this method has a switching time equivalent to several frames. In addition, the phase difference between a plurality of signal sources may cause issues such as image tearing. Therefore, it is necessary to propose a solution to achieve the objects of fast switching and perfect connection, so that the display screen of the display device is correct and smooth, and the issues of image freeze and image tearing are avoided.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an image output device and an image output method thereof that may quickly switch to a backup signal source when the signal source is unstable, so as to achieve the objects of fast switching and perfect connection.

Other objects and advantages of the invention may be further understood from the technical features disclosed by the invention.

In order to achieve one or part or all of the above objects or other objects, an embodiment of the invention provides an image output device. The image output device is coupled to a first signal source and a second signal source. The image output device includes a plurality of memories, a source selection circuit, and an image output circuit. The plurality of memories are configured to store a plurality of frame image data respectively. The source selection circuit is coupled to the first signal source, the second signal source, and the plurality of memories. The source selection circuit is configured to choose to store a first frame image data transmitted by the first signal source or the first frame image data transmitted by the second signal source in one of the plurality of memories according to a working state of the first signal source. The image output circuit is coupled to the plurality of memories and the source selection circuit. The image output circuit is configured to output the first frame image data stored in one of the plurality of memories.

In order to achieve one or part or all of the above objects or other objects, an embodiment of the invention provides an image output method suitable for an image output device. The image output device is coupled to a first signal source and a second signal source, and the image output device includes a plurality of memories. The image output method includes: determining a working state of the first signal source by the image output device; choosing to store a first frame image data transmitted by the first signal source or the first frame image data transmitted by the second signal source in a first memory in the plurality of memories by the image output device according to the working state of the first signal source; and outputting the first frame image data from the first memory by the image output device.

Based on the above, the embodiments of the invention have at least one of the following advantages or effects. In the invention, switching to the second signal source may be performed when the first signal source is unstable, so as to ensure the correctness and fluency of the outputted frame image data and to avoid issues such as image freeze and image tearing caused by an unstable signal source.

In order to make the above features and advantages of the invention better understood, embodiments are specifically provided below with reference to figures for detailed description as follows.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The foregoing and other technical content, features, and effects of the invention will be clearly presented in the following detailed description of a preferred embodiment with reference to the accompanying figures. In addition, the terminology mentioned in the embodiments, such as: up, down, left, right, front, rear, etc., are only directions referring to the figures. Therefore, the directional terms used are used for illustration, not for limiting the invention.

Figure 1:
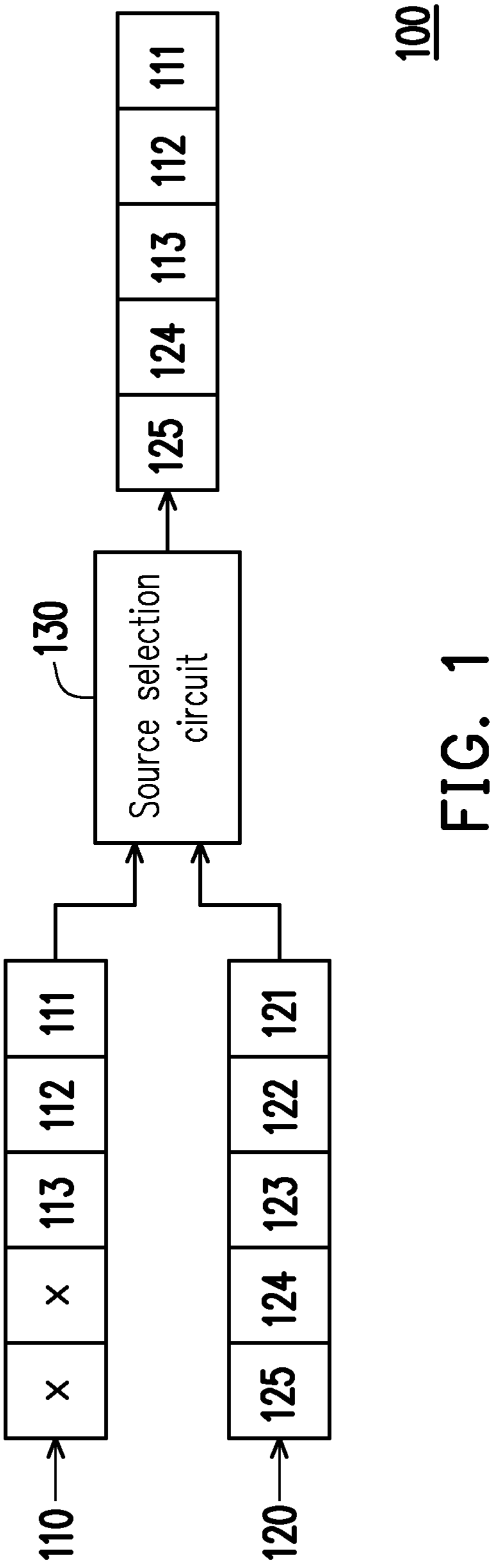
FIG. 1 shows a diagram of the operation of an image output device of the invention.

FIG. 1 shows a diagram of the operation of an image output device of the invention. Please refer to FIG. 1, an image output device 100 is coupled to a first signal source 110 and a second signal source 120. The image output device 100 is, for example, a central processing unit (CPU) or other programmable general or application-specific micro control unit (MCU), microprocessor, digital signal processor (DSP), programmable controller, application-specific integrated circuit (ASIC), graphics processing unit (GPU), image signal processor (ISP), image processing unit (IPU), arithmetic logic unit (ALU), complex programmable logic device (CPLD), field-programmable gate array (FPGA), or a similar element or a combination of the above elements.

The image output device 100 at least includes a source selection circuit 130. The image output device 100 sequentially receives frame image data 111 to 113 from the first signal source 110. Specifically, the image output device 100 receives the frame image data 111 from the first signal source 110 at a first time point. The image output device 100 receives the frame image data 112 from the first signal source 110 at a second time point. The image output device 100 receives the frame image data 113 from the first signal source 110 at a third time point. However, at the subsequent fourth time point and fifth time point, the image output device 100 fails to receive the frame image data due to the unstable or interrupted first signal source (indicated by "x" in FIG. 1).

Similarly, the image output device 100 sequentially receives frame image data 121 to 125 from the second signal source 120. Specifically, the image output device 100 receives the frame image data 121 from the second signal source 120 at a first time point. The image output device 100 receives the frame image data 122 from the second signal source 120 at a second time point. The image output device 100 receives the frame image data 123 from the second signal source 120 at a third time point. The image output device 100 receives the frame image data 124 from the second signal source 120 at a fourth time point. The image output device 100 receives the frame image data 125 from the second signal source 120 at a fifth time point. It may be seen from FIG. 1 that the second signal source 120 is not unstable or interrupted, so the image output device 100 may smoothly receive the frame image data 121 to 125 from the second signal source 120 in sequence. It should be noted that the content transmitted by the second signal source 120 is the same as the content transmitted by the first signal source 110. That is, the content of the frame image data 111 to 113 is the same as the content of the frame image data 121 to 123, respectively. However, the data format of the frame image data 111 to 113 may be the same as or different from the frame image data 121 to 125.

The source selection circuit 130 is coupled to the first signal source 110 and the second signal source 120. The source selection circuit 130 may choose to store the frame image data transmitted by the first signal source 110 or the second signal source 120 according to the working state of the first signal source 110 (for example, whether a signal is interrupted). When there is no signal interruption in the first signal source 110, the source selection circuit 130 may choose to store a frame image data (for example, the frame image data 111) transmitted by the first signal source 110. When there is a signal interruption in the first signal source 110, the source selection circuit 130 may choose to store a frame image data (for example, the frame image data 124) transmitted by the second signal source 120. Then, an image output circuit (not shown) coupled to the source selection circuit 130 may output the stored frame image data. Taking FIG. 1 as an example, the image output circuit may sequentially output the frame image data 111, 112, 113, 124, and 125.

Figure 2:
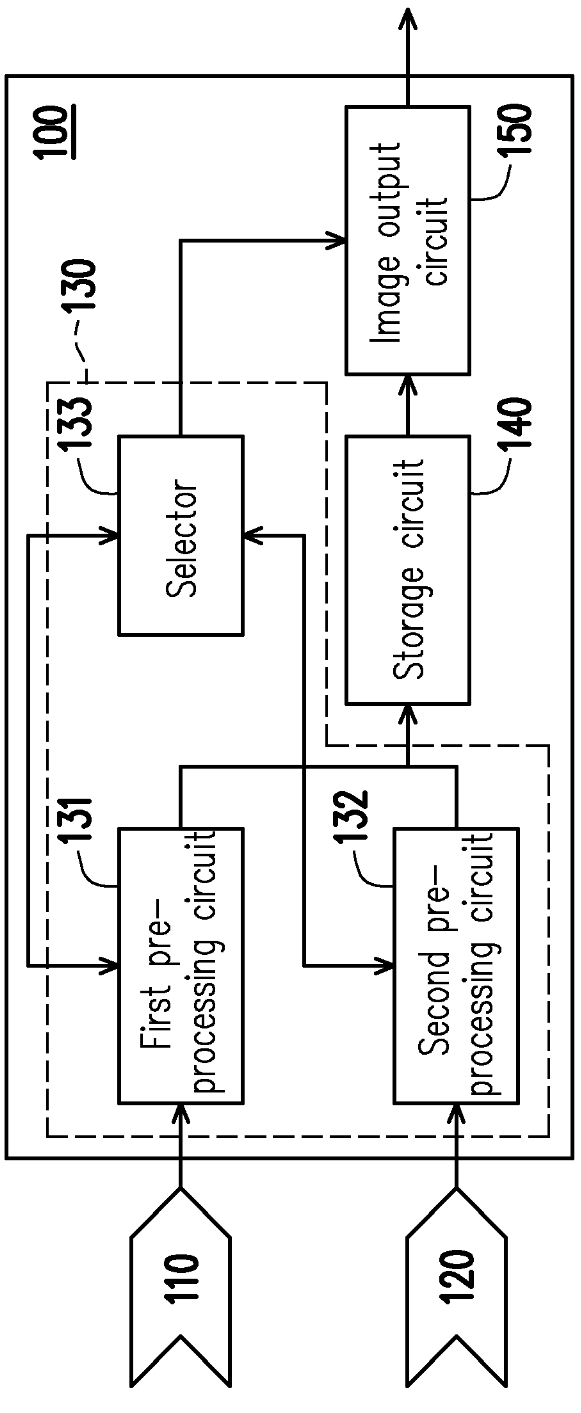
FIG. 2 shows a block diagram of an image output device of an embodiment of the invention.

The plurality of frame image data inputted via a high-speed transmission interface have continuity and are real-time. Therefore, the object of continuously outputting frame image data needs to be achieved via the cooperation of output delay and a storage device. FIG. 2 shows a block diagram of an image output device of an embodiment of the invention. Please refer to FIG. 2, the image output device 100 includes the source selection circuit 130, a storage circuit 140, and an image output circuit 150. In particular, the source selection circuit 130 includes a first pre-processing circuit 131, a second pre-processing circuit 132, and a selector 133.

The storage circuit 140 is, for example, any type of fixed or removable random-access memory (RAM), read-only memory (ROM), flash memory, hard disk drive (HDD), solid-state drive (SSD), or a similar element or a combination of the above elements configured to store a frame image data. The storage circuit 140 includes a plurality of memories configured to store a plurality of frame image data. The first pre-processing circuit 131 and the second pre-processing circuit 132 are respectively coupled to the first signal source 110 and the second signal source 120 to sequentially receive a plurality of frame image data from the first signal source 110 and sequentially receive a plurality of frame image data from the second signal source 120.

The first pre-processing circuit 131 is configured to perform a first digital signal processing on the frame image data from the first signal source 110 to generate processed frame image data. The second pre-processing circuit 132 is configured to perform a second digital signal processing on the frame image data from the second signal source 120 to generate processed frame image data. In order to automatically select a backup signal (such as the second signal source 120) when signal interruption occurs, the first pre-processing circuit 131 and the second pre-processing circuit 132 may respectively include a first state detection circuit and a second state detection circuit (not shown). The first state detection circuit is configured to detect whether the working state of the first signal source 110 is abnormal (for example, signal interruption), and transmit a generated first detection result to the selector 133. The second state detection circuit is configured to detect whether the working state of the second signal source 120 is abnormal (for example, signal interruption), and transmit a generated second detection result to the selector 133. The selector 133 is simultaneously coupled to the first pre-processing circuit 131 and the second pre-processing circuit 132 to receive the first detection result and the second detection result.

When the first detection result indicates that the working state of the first signal source 110 is normal, the selector 133 may preferentially select the first signal source 110 as the source of the frame image data. When the first detection result indicates that the working state of the first signal source 110 is abnormal, the selector 133 may select the second signal source 120 as the source of the frame image data. The selector 133 may generate a first control signal and a second control signal according to the working state of the first signal source 110, wherein the first control signal and the second control signal may include the storage order corresponding to the processed frame image data. The first pre-processing circuit 131 and the second pre-processing circuit 132 are simultaneously coupled to the storage circuit 140. The first pre-processing circuit 131 and the second pre-processing circuit 132 may store the frame image data from the first signal source 110 or the second signal source 120 in a designated memory according to the first control signal and the second control signal, respectively. For example, when the working state of the first signal source 110 is normal, the first pre-processing circuit 131 may store the frame image data from the first signal source 110 in a designated memory according to the first control signal. When the working state of the first signal source 110 is abnormal, the second pre-processing circuit 132 may store the frame image data from the second signal source 120 in a designated memory according to the second control signal.

In an embodiment, after detecting that the first signal source 110 for which the signal is interrupted restored the signal thereof, the selector 133 may switch back to the first signal source 110 again. In another embodiment, the selector 133 may also refer to the working state of the first signal source 110 and the working state of the second signal source 120 simultaneously to select the first signal source 110 or the second signal source 120 as the source of the frame image data. Further, in the case that the system may support more signal sources, a plurality of signal sources thereof may be set as backup signal sources, so that the output image is less likely to be interrupted.

The image output circuit 150 is coupled to the selector 133 and the storage circuit 140. The selector 133 may generate a third control signal and transmit the third control signal to the image output circuit 150. The image output circuit 150 may read the frame image data from a designated memory in the plurality of memories according to the third control signal and output the read frame image data. In order to achieve a perfect connection, a delay equivalent to at least one frame time interval is required between the input and output of frame image data. For example, from when the frame image data 113 is inputted from the first signal source 110 to when the frame image data 113 is outputted by the image output circuit 150, there is a delay equivalent to at least one frame time interval. When signal interruption of the first signal source 110 is detected, the image output device may switch to the second signal source 120 in real time to receive the frame image data 124. When the frame image data 113 is inputted, the frame image data 124 is stored in one of the plurality of memories. In this way, the frame image data 124 may be perfectly connected after the frame image data 113, and outputted immediately after the frame image data 113.

In the embodiment, the storage circuit 140 includes at least three memories. Each memory may be selected from a dynamic random-access memory (DRAM), a static random-access memory (SRAM), and a buffer. Each memory may store one frame image data. Among the three memories, two memories may be configured to be read by the image output circuit 150, and the other memory may be configured to be written with frame image data. The input channel and the output channel of each memory both have a control module to control the read and write actions to achieve the object of reading and writing for the correct memory location.

Due to the existence of the storage circuit 140, the input terminal and the output terminal of the frame image data may perform image processing using different bits per second (bps). The frame image data transmitted by the first signal source 110 and the second signal source 120 may also adopt different resolutions, frame rates, and color spaces. Regardless of whether the frames per second (FPS), image size, and phase of the frame image data transmitted by the first signal source 110 and the second signal source 120 are the same, the output terminal of the frame image data may be outputted according to the predetermined FPS and image size, and then a perfect connection may be achieved at the moment of switching. In contrast, when there is no phase difference between the frame image data transmitted by the first signal source 110 and the second signal source 120 and the frame image data transmitted by the first signal source 110 and the second signal source 120 have the same image resolution and the same number of frames processed per second, the control time for switching selection may be shortened to a time interval corresponding to the difference in the number of lines of the frame latency of the two signal sources. In other words, the backup signal source only needs to store enough backup data of the frame image data in the memory.

Figure 3:
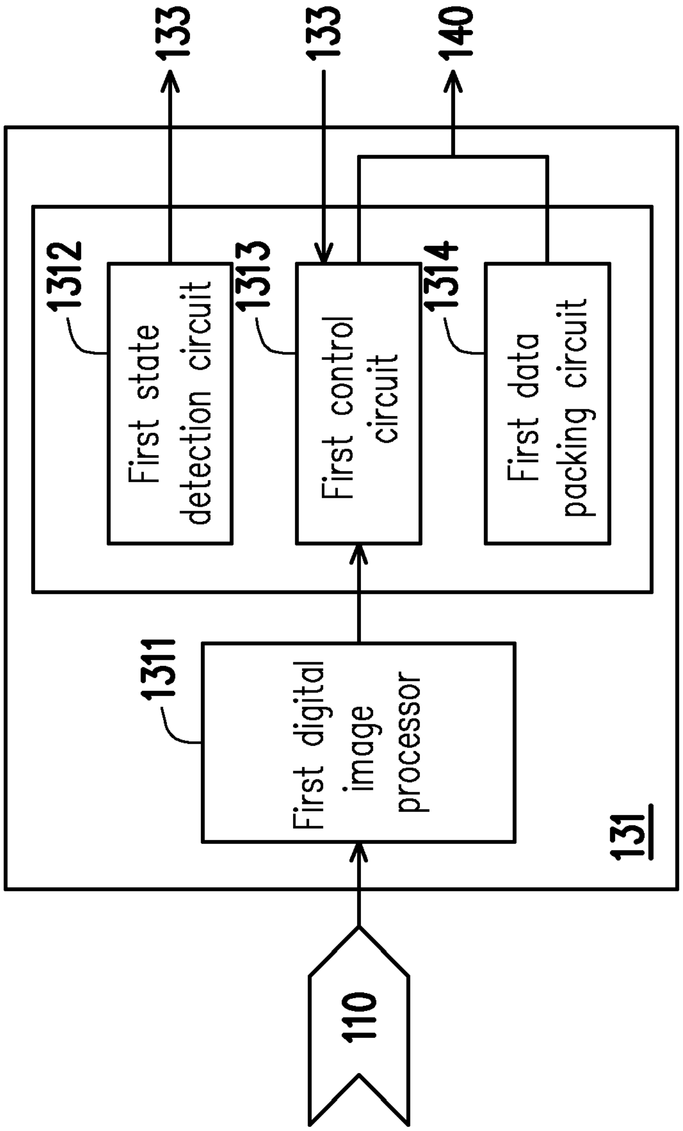
FIG. 3 shows a block diagram of a first pre-processing circuit of an embodiment of the invention.

FIG. 3 shows a block diagram of a first pre-processing circuit of an embodiment of the invention. Please refer to FIG. 3, the first pre-processing circuit 131 is coupled to the first signal source 110, the selector 133 and the storage circuit 140. The first pre-processing circuit 131 includes a first digital image processor 1311, a first state detection circuit 1312, a first control circuit 1313, and a first data packing circuit 1314.

The first digital image processor 1311 is coupled to the first signal source 110 to receive the frame image data from the first signal source 110. The first digital image processor 1311 is configured to perform first digital signal processing on the received frame image data to transfer the frame image data to the first state detection circuit 1312, the first control circuit 1313, and the first data packing circuit 1314. In an embodiment, the first pre-processing circuit 131 does not include the first digital image processor 1311. And in this embodiment, the first state detection circuit 1312, the first control circuit 1313, and the first data packing circuit 1314 are coupled to the first signal source 110 to receive the frame image data from the first signal source 110.

The first state detection circuit 1312 is coupled to the first digital image processor 1311 or the first signal source 110 to detect whether the working state of the first signal source 110 is abnormal and transmit the generated first detection result to the selector 133. In many situations, the first state detection circuit 1312 may determine the first signal source 110 is interrupted. For example, the first state detection circuit 1312 may sample the pixel clock signal transmitted by the first signal source 110 at a frequency of, for example, 100 megahertz (MHz) within a unit time (for example, 100 milliseconds). When the sampling result is less than the reasonable minimum value of the transition minimized differential signaling (TMDS), the first state detection circuit 1312 generates the first detection result indicating the signal is interrupted. The above reasonable minimum value is, for example, 25.175 MHz (that is, the resolution is 640×480, and the refresh rate is 60 Hz).

Moreover, the first state detection circuit 1312 may also determine whether the signal of the first signal source 110 is interrupted by counting the interval time length between a plurality of horizontal synchronizing signals (Hsync) in the frame image data. It is known by those skilled in the art that the frame image data is represented by a horizontal synchronizing signal for line feed. Each horizontal synchronizing signal represents the beginning of one line of data. The horizontal synchronizing signal transitions from a low voltage level to a high voltage level and maintains a high voltage level for a period of time to indicate line feed. A time length threshold may be established in the first state detection circuit 1312 in advance. This time length threshold is equivalent to the interval time length between two horizontal synchronizing signals under normal conditions. More specifically, the interval time length between the time point when the horizontal synchronizing signal transitions from a low voltage level to a high voltage level and the time point when the horizontal synchronizing signal transitions from a low voltage level to a high voltage level again may be taken as the above time length threshold.

When the first pre-processing circuit 131 receives the frame image data, the first state detection circuit 1312 may count continuously in a stable manner for a certain period of time using an internal counter (not shown). Therefore, the count size value is related to the time length. Specifically, the counter may start counting at the time point when the horizontal synchronizing signal transitions from a low voltage level to a high voltage level to obtain a cumulative result. The cumulative result is reset to zero at the time point when the horizontal synchronizing signal transitions from a low voltage level to a high voltage level again, and counting is performed again. When the cumulative result exceeds the above time length threshold, the first state detection circuit 1312 determines the signal of the first signal source 110 is interrupted. In particular, the time length threshold and the cumulative result may be represented by the time length or the number of samples.

The first control circuit 1313 is configured to generate a control signal based on the selector 133 and store the packed frame image data in one of the plurality of memories according to a storage order, and the first control circuit 1313 sequentially designates one of the plurality of memories as a designated memory according to the storage order. The storage order is determined by the selector 133 according to a usage status of the plurality of memories, and is based on the principle of first in, first out.

The first data packing circuit 1314 is configured to pack the frame image data. When the working state of the first signal source 110 is normal, the packed frame image data generated by the first data packing circuit 1314 is designated by the first control circuit 1313 to be stored in a designated memory.

It should be noted that the structure of the second pre-processing circuit 132 is substantially the same as that of the first pre-processing circuit 131. In other words, the second pre-processing circuit 132 also includes a second digital image processor, a second state detection circuit, a second control circuit, and a second data packing circuit, and the functions thereof are respectively the same as the first digital image processor 1311, the first state detection circuit 1312, the first control circuit 1313, and the first data packing circuit 1314 and are therefore not repeated herein.

Please refer to both FIG. 1 and FIG. 3 for the detailed steps of storing signals. First, the selector 133 may choose to receive the frame image data 111 from the first signal source 110 and generate the first control signal according to the first detection result. The first control circuit 1313 may store the packed frame image data 111 in a designated memory according to the first control signal, for example, the first memory in the three memories. Then, the selector 133 may choose to receive the frame image data 112 from the first signal source 110 and generate the first control signal according to the first detection result. The first control circuit 1313 may store the packed frame image data 112 in a designated memory according to the first control signal, for example, the second memory in the three memories. Similarly, the selector 133 may choose to receive the frame image data 113 from the first signal source 110 and generate the first control signal according to the first detection result. The first control circuit 1313 may store the packed frame image data 113 in a designated memory according to the first control signal, for example, the third memory in the three memories. At this time, the first memory is configured to be read by the image output circuit 150.

Then, the selector 133 may choose to receive the frame image data 124 from the second signal source 120 and generate the second control signal according to the first detection result. The second control circuit of the second pre-processing circuit 132 may store the packed frame image data 124 in a designated memory according to the second control signal, for example, the first memory in the three memories. At this time, the second memory is configured to be read by the image output circuit 150. The selector 133 may choose to receive the frame image data 125 from the second signal source 120 and generate the second control signal according to the first detection result. The second control circuit of the second pre-processing circuit 132 may store the packed frame image data 125 in a designated memory according to the second control signal, for example, the second memory in the three memories. At this time, the third memory is configured to be read by the image output circuit 150.

Figure 4:
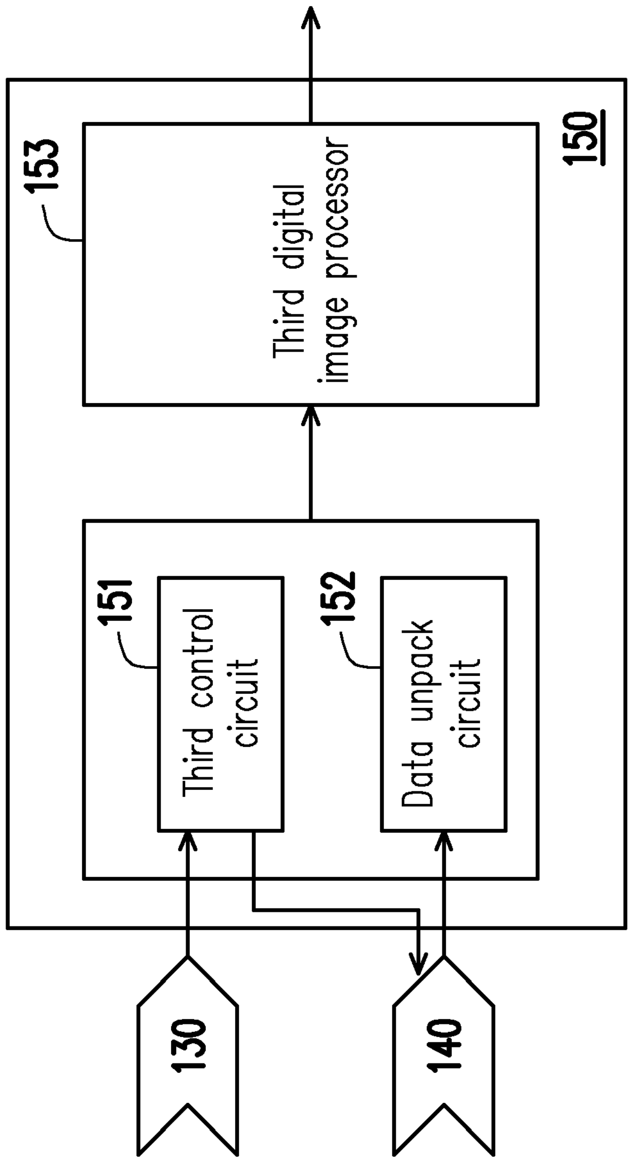
FIG. 4 shows a block diagram of an image output circuit of an embodiment of the invention.

FIG. 4 shows a block diagram of an image output circuit of an embodiment of the invention. Please refer to FIG. 4, the image output circuit 150 is coupled to the source selection circuit 130 and the storage circuit 140. The image output circuit 150 includes a first post-processing circuit and a third digital image processor 153. The first post-processing circuit includes a third control circuit 151, a data unpack circuit 152. The third control circuit 151 is coupled to the source selection circuit 130 and the storage circuit 140. The third control circuit 151 generates a corresponding read control signal according to the third control signal (related to the storage order) generated from the source selection circuit 130. The read control signal (including the location information of the memory to be read) is transmitted to the storage circuit 140. A packed frame image data in the memory to be read is read out and sent to the data unpack circuit 152. The data unpack circuit 152 is configured to restore the packed frame image data to obtain an unpacked frame image data.

The third digital image processor 153 is configured to perform a third digital signal processing on the received unpacked frame image data to generate an output frame image data. It should be noted that since the details of the first digital signal processing, the second digital signal processing, and the third digital signal processing are not the focus of the invention, and the first digital image processor 1311, the second digital image processor, and the third digital image processor 153 are not necessary elements for implementing the invention, the details thereof are not described herein.

Figure 5:
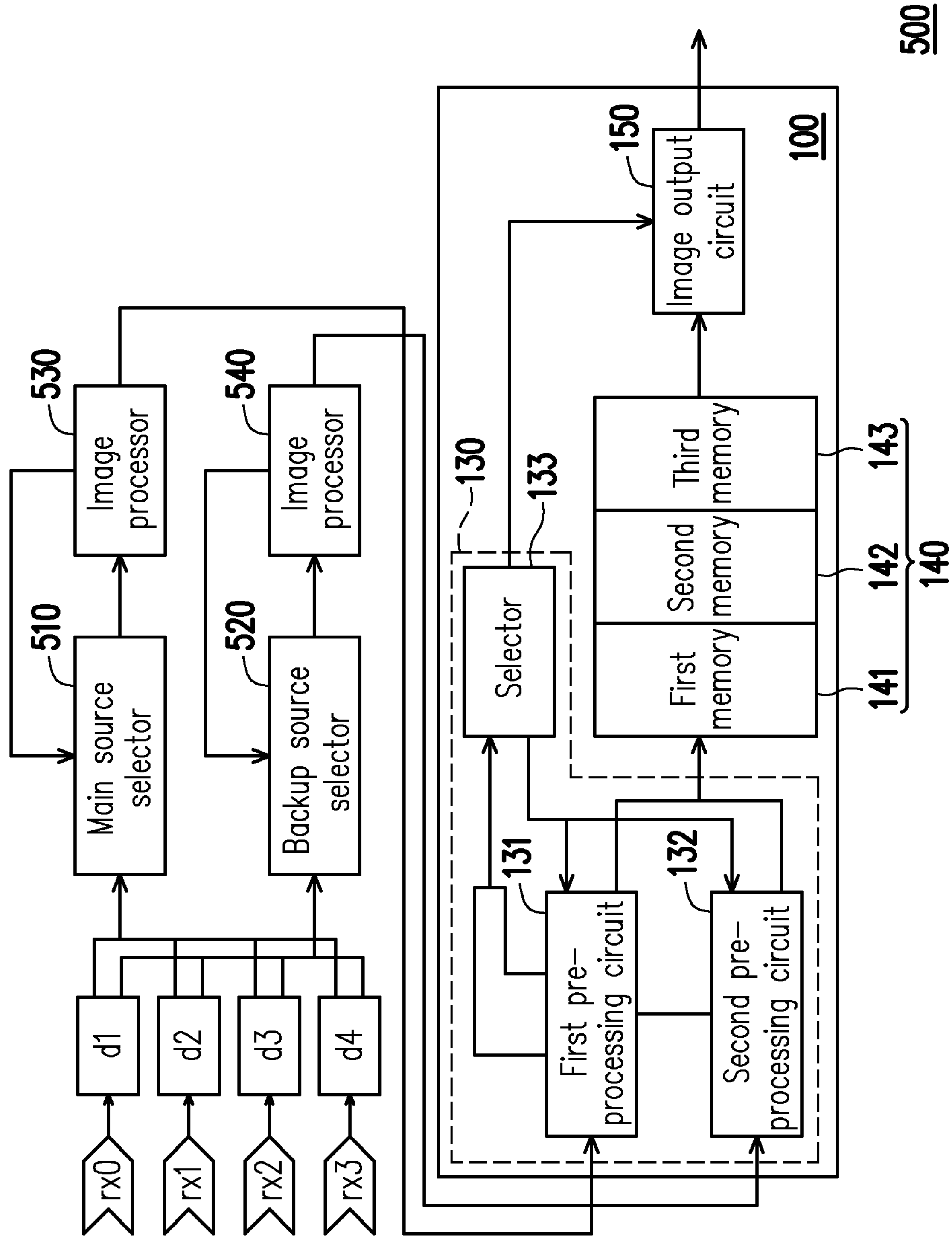
FIG. 5 shows a block diagram of an image output system of another embodiment of the invention.

FIG. 5 shows a block diagram of an image output system of another embodiment of the invention. Regarding the image output device 100 in FIG. 5, please refer to the image output device 100 in the embodiment of FIG. 2 and the first pre-processing circuit 131 in the embodiment of FIG. 3 for related descriptions, which are not repeated herein. In addition, FIG. 5 also shows the first memory 141, the second memory 142, and the third memory 143 in the storage circuit 140.

As shown in FIG. 5, in a stable state, four groups of signal input sources rx0 to rx4 in an image output system 500 send out indication signals indicating a stable state. In addition to obtaining these indication signals, detection circuits d1 to d4 also store the related parameters related to the four groups of signal input sources rx0 to rx4. The above related parameters include, but are not limited to, the size of the inputted frame image data, the number of processed frames per second, whether locking is completed, and other parameters that the image processing circuit needs. The detection circuits d1 to d4 may take the related parameters of the signal input sources rx0 to rx4 as the detection targets. Specifically, if the signal input sources rx0 to rx4 are in a stable state, the detection circuits d1 to d4 may receive and analyze the size of the frame image data, and generate an indication signal based on that the size of the frame image data received each time is consistent. In contrast, if the signal input sources rx0 to rx4 are not in a stable state, the detection circuits d1 to d4 may send out abnormal signals based on the inconsistency between the previous and current frame image data sizes, to inform a main source selector 510 or a backup source selector 520 to select other signal sources from the four groups of signal input sources rx0 to rx4.

In a situation in which there are a plurality of groups of input sources rx0 to rx4, the main source selector 510 and the backup source selector 520 may each select a different signal source. The image data transmitted by the selected two signal sources, and the corresponding indication signals and related parameters are respectively processed by image processors 530 and 540 and temporarily stored. Moreover, the image processors 530 and 540 may further control the main source selector 510 and the backup source selector 520 to switch signal sources. Specifically, when the image processors 530 and 540 determine the image data does not meet the settings based on the content of the image data or related parameters, the main source selector 510 or the backup source selector 520 may be notified to select other signal sources from the four groups of signal input sources rx0 to rx4. For example, the image processors 530 and 540 may notify the main source selector 510 or the backup source selector 520 to select other signals from the four groups of signal input sources rx0 to rx4 based on that the resolution of the currently received image data is not supported by a display equipment source. It may be understood that the number of a plurality of groups of input sources rx0 to rxN is equal to the number of a plurality of detection circuits d1 to dN, and the number is, for example, but not limited to, four.

In addition to temporarily storing the processed image data, the above signal indicating a stable state may be transmitted to the source selection circuit 130 via the state detection circuit in the pre-processing circuit (as shown in FIG. 3). In other words, the first state detection circuit 1312 may determine whether the signal of the signal source is interrupted according to the receiving situation of the signal indicating a stable state.

The selector 133 of the source selection circuit 130 determines the memory to be stored according to this signal, and the image output circuit 150 reads out the frame image data stored in the storage circuit 140. The read frame image data is processed by a subsequent digital signal processing program, and then outputted by the image output circuit 150.

It should be mentioned that, since the input terminal and the output terminal of the frame image data are separated by the storage circuit 140, the input terminal and the output terminal may perform image processing using their respective bit rates. That is, regardless of whether there is a difference in FPS, image size, and phase difference between the main input terminal and the backup input terminal, the output may be outputted with a fixed FPS and image size to achieve a perfect connection at the switching moment.

Figure 6:
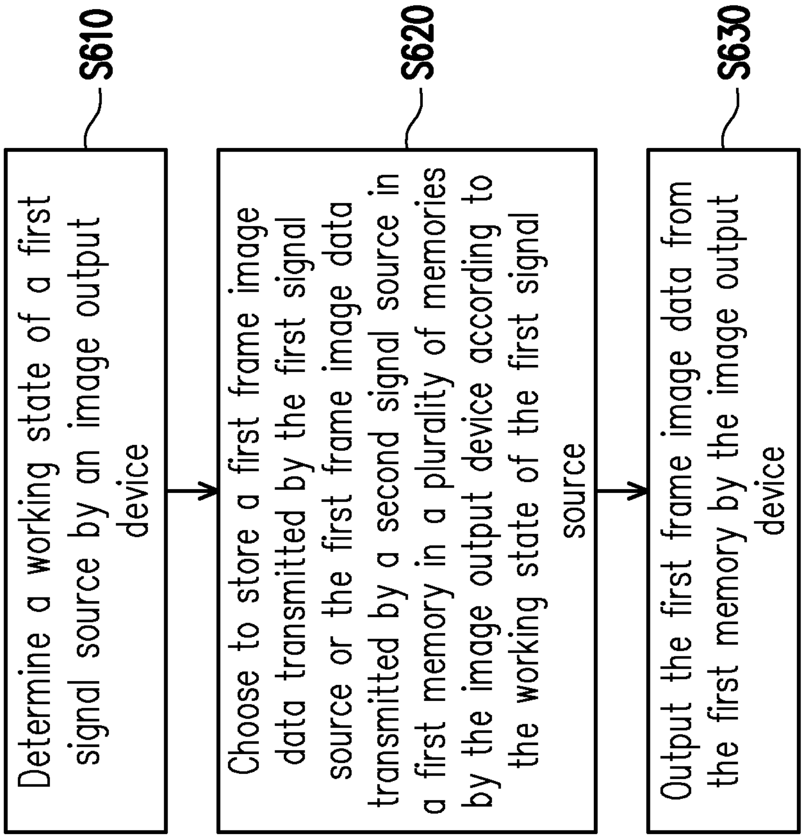
FIG. 6 shows a flowchart of steps of an image output method of an embodiment of the invention.

FIG. 6 shows a flowchart of steps of an image output method of an embodiment of the invention. Please refer to FIG. 6, in step S610, a working state of a first signal source is determined by an image output device. In step S620, a first frame image data transmitted by the first signal source or the first frame image data transmitted by a second signal source is chosen to be stored in a first memory in a plurality of memories by the image output device according to the working state of the first signal source. In step S630, the first frame image data is outputted from the first memory by the image output device.

Based on the above, the embodiments of the invention have at least one of the following advantages or effects. In the invention, switching to another signal source may be performed when one signal source is unstable, and the correctness and fluency of the outputted frame image data may be ensured by the cooperation of output delay and a storage device to avoid issues such as image freeze and image tearing caused by an unstable signal source.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image output device, wherein the image output device is coupled to a first signal source and a second signal source, and the image output device comprises:

a plurality of memories configured to store a plurality of frame image data respectively;

a source selection circuit coupled to the first signal source, the second signal source, and the plurality of memories, and the source selection circuit is configured to choose a first frame image data transmitted by the first signal source or the first frame image data transmitted by the second signal source according to a working state of the first signal source, wherein one of the plurality of memories stores the first frame image data transmitted by the first signal source or the first frame image data transmitted by the second signal source chosen by the source selection circuit, wherein content of the first frame image data transmitted from the first signal source and content of the first frame image data transmitted from the second signal source are the same, wherein the source selection circuit comprises:

a first pre-processing circuit coupled between the first signal source and the plurality of memories, and the first pre-processing circuit is configured to perform a digital signal processing on the first frame image data from the first signal source to generate a processed first frame image data, wherein the first pre-processing circuit comprises a first state detection circuit configured to detect whether the working state of the first signal source is abnormal, wherein the source selection circuit is further configured to determine whether to store the processed first frame image data to one of the plurality of memories according to a detection result; and an image output circuit coupled to the plurality of memories and the source selection circuit and configured to output the first frame image data stored in corresponding one of the plurality of memories.

2. The image output device of claim 1, wherein there is a delay of at least one frame time interval between the first frame image data outputted by the image output device and the first frame image data inputted to the image output device.

3. The image output device of claim 1, wherein the first state detection circuit is configured to sample a pixel clock signal of the first signal source and determine the working state of the first signal source is abnormal when a sampling result is less than a threshold.

4. The image output device of claim 1, wherein the first frame image data comprises a horizontal synchronizing signal and two consecutive pulses of the horizontal synchronizing signal are separated by a first time interval, and the first state detection circuit is configured to determine the working state of the first signal source is abnormal when a length of the first time interval is greater than a threshold.

5. The image output device of claim 1, wherein the first pre-processing circuit further comprises:

a first control circuit configured to sequentially designate one of the plurality of memories as a designated memory according to a storage order; and a first data packing circuit configured to pack the first frame image data and store the packed first frame image data in the designated memory when the working state of the first signal source is normal, wherein the storage order is determined by the source selection circuit according to a usage status of the plurality of memories.

6. The image output device of claim 1, wherein the source selection circuit is further configured to choose the first frame image data transmitted by the first signal source or the first frame image data transmitted by the second signal source according to the working state of the first signal source and the working state of the second signal source, wherein one of the plurality of memories stores the first frame image data transmitted by the first signal source or the first frame image data transmitted by the second signal source chosen by the source selection circuit.

7. The image output device of claim 1, wherein a number of the plurality of memories is three, and when the first frame image data stored in one of the memories is outputted, the source selection circuit designates one of the memories as a designated memory to store a second frame image data transmitted by the first signal source or the second frame image data transmitted by the second signal source, wherein the second frame image data is immediately after the first frame image data in a display timing.

8. The image output device of claim 1, wherein a number of the plurality of memories is three, and an output order of the frame image data in the three memories is first in, first out.

9. The image output device of claim 1, wherein the image output circuit further comprises:

a first post-processing circuit coupled to the plurality of memories and configured to perform a digital signal processing on a frame image data read from a designated memory, wherein the first post-processing circuit comprises:

a third control circuit configured to generate a read control signal according to the control signal generated from the source selection circuit and transmit the read control signal to the plurality of memories; and a data unpack circuit configured to unpack the read frame image data.

10. An image output method suitable for an image output device, wherein the image output device is coupled to a first signal source and a second signal source, the image output device comprises a plurality of memories, and the image output method comprises:

determining a working state of the first signal source by the image output device;

choosing a first frame image data transmitted by the first signal source or the first frame image data transmitted by the second signal source by the image output device according to the working state of the first signal source, wherein a first memory in the plurality of memories stores the first frame image data transmitted by the first signal source or the first frame image data transmitted by the second signal source chosen by the image output device, wherein content of the first frame image data transmitted from the first signal source and content of the first frame image data transmitted from the second signal source are the same;

performing a digital signal processing on the first frame image data transmitted by the first signal source to generate a processed first frame image data by the image output device;

detecting whether the working state of the first signal source is abnormal, and determining whether to store the processed first frame image data to the first memory according to a detection result by the image output device; and outputting the first frame image data from the first memory by the image output device.

11. The image output method of claim 10, wherein there is a delay of at least one frame time interval between the first frame image data outputted by the image output device and the first frame image data inputted to the image output device.

12. The image output method of claim 10, further comprising:

sampling a pixel clock signal of the first signal source and determining the working state of the first signal source is abnormal when a sampling result is less than a threshold.

13. The image output method of claim 10, wherein the first frame image data comprises a horizontal synchronizing signal, two consecutive pulses of the horizontal synchronizing signal are separated by a first time interval, and the image output method further comprises:

detecting a length of the first time interval, and determining the working state of the first signal source is abnormal when the length of the first time interval is greater than a threshold.

14. The image output method of claim 10, further comprising:

designating one of the plurality of memories as a designated memory in sequence according to a storage order, wherein the storage order is determined according to a usage status of the plurality of memories;

packing the first frame image data and storing the packed first frame image data in the designated memory when the working state of the first signal source is normal.

15. The image output method of claim 10, further comprising:

choosing the first frame image data transmitted by the first signal source or the first frame image data transmitted by the second signal source according to the working state of the first signal source and the working state of the second signal source; wherein the first memory in the plurality of memories stores the first frame image data transmitted by the first signal source or the first frame image data transmitted by the second signal source chosen by the image output device.

16. The image output method of claim 10, wherein a number of the plurality of memories is three, and the image output method further comprises:

designating one of the three memories as a designated memory to store a second frame image data transmitted by the first signal source or the second frame image data transmitted by the second signal source when the first frame image data stored in the one of the three memories is outputted, wherein the second frame image data is immediately after the first frame image data in a display timing.

17. The image output method of claim 10, wherein a number of the plurality of memories is three, and an output order of frame image data in the three memories is first in, first out.

18. The image output method of claim 10, further comprising:

designating one of the plurality of memories as a designated memory in sequence according to a storage order to perform a store-in or read-out to the designated memory, wherein the storage order is determined according to a usage status of the plurality of memories;

unpacking and performing digital signal processing on a read frame image data.

19. An image output device, wherein the image output device is coupled to a first signal source and a second signal source, and the image output device comprises:

a plurality of memories configured to store a plurality of frame image data respectively;

a source selection circuit coupled to the first signal source, the second signal source, and the plurality of memories and the source selection circuit is configured to choose a first frame image data transmitted by the first signal source or the first frame image data transmitted by the second signal source according to a working state of the first signal source, wherein one of the plurality of memories stores the first frame image data transmitted by the first signal source or the first frame image data transmitted by the second signal source chosen by the source selection circuit; and an image output circuit coupled to the plurality of memories and the source selection circuit and configured to output the first frame image data stored in corresponding one of the plurality of memories, wherein the source selection circuit further comprises:

a first pre-processing circuit coupled between the first signal source and the plurality of memories and configured to perform a digital signal processing on the first frame image data to generate a processed first frame image data, wherein the first pre-processing circuit comprises:

a first state detection circuit configured to detect whether the working state of the first signal source is abnormal, wherein the source selection circuit is further configured to determine whether to store the processed first frame image data to one of the plurality of memories according to a detection result, wherein the first frame image data comprises a horizontal synchronizing signal and two consecutive pulses of the horizontal synchronizing signal are separated by a first time interval, and the first state detection circuit is configured to determine the working state of the first signal source is abnormal when a length of the first time interval is greater than a threshold.

20. An image output device, wherein the image output device is coupled to a first signal source and a second signal source, and the image output device comprises:

a plurality of memories configured to store a plurality of frame image data respectively;

a source selection circuit coupled to the first signal source, the second signal source, and the plurality of memories and the source selection circuit is configured to choose a first frame image data transmitted by the first signal source or the first frame image data transmitted by the second signal source according to a working state of the first signal source, wherein one of the plurality of memories stores the first frame image data transmitted by the first signal source or the first frame image data transmitted by the second signal source chosen by the source selection circuit; and an image output circuit coupled to the plurality of memories and the source selection circuit and configured to output the first frame image data stored in corresponding one of the plurality of memories, wherein the source selection circuit further comprises:

a first pre-processing circuit coupled between the first signal source and the plurality of memories and configured to perform a digital signal processing on the first frame image data to generate a processed first frame image data, wherein the first pre-processing circuit comprises:

a first state detection circuit configured to detect whether the working state of the first signal source is abnormal and the source selection circuit is further configured to determine whether to store the processed first frame image data to one of the plurality of memories according to a detection result, wherein the first pre-processing circuit further comprises:

a first control circuit configured to sequentially designate one of the plurality of memories as a designated memory according to a storage order; and a first data packing circuit configured to pack the first frame image data and store the packed first frame image data in the designated memory when the working state of the first signal source is normal, wherein the storage order is determined by the source selection circuit according to a usage status of the plurality of memories.

21. An image output method suitable for an image output device, wherein the image output device is coupled to a first signal source and a second signal source, the image output device comprises a plurality of memories, and the image output method comprises:

determining a working state of the first signal source by the image output device;

choosing a first frame image data transmitted by the first signal source or the first frame image data transmitted by the second signal source by the image output device according to the working state of the first signal source, wherein a first memory in the plurality of memories stores the first frame image data transmitted by the first signal source or the first frame image data transmitted by the second signal source chosen by the image output device;

performing a digital signal processing on the first frame image data transmitted by the first signal source to generate a processed first frame image data;

detecting whether the working state of the first signal source is abnormal, and determining whether to store the processed first frame image data to the first memory according to a detection result, wherein the first frame image data comprises a horizontal synchronizing signal, two consecutive pulses of the horizontal synchronizing signal are separated by a first time interval, wherein step of detecting whether the working state of the first signal source is abnormal comprising: detecting a length of the first time interval, and determining the working state of the first signal source is abnormal when the length of the first time interval is greater than a threshold; and outputting the first frame image data from the first memory by the image output device.

22. An image output method suitable for an image output device, wherein the image output device is coupled to a first signal source and a second signal source, the image output device comprises a plurality of memories, and the image output method comprises:

determining a working state of the first signal source by the image output device;

choosing a first frame image data transmitted by the first signal source or the first frame image data transmitted by the second signal source by the image output device according to the working state of the first signal source, wherein a first memory in the plurality of memories stores the first frame image data transmitted by the first signal source or the first frame image data transmitted by the second signal source chosen by the image output device;

performing a digital signal processing on the first frame image data transmitted by the first signal source to generate a processed first frame image data;

detecting whether the working state of the first signal source is abnormal, and determining whether to store the processed first frame image data to the first memory according to a detection result, designating one of the plurality of memories as a designated memory in sequence according to a storage order, wherein the storage order is determined according to a usage status of the plurality of memories;

packing the first frame image data and storing the packed first frame image data in the designated memory when the working state of the first signal source is normal; and outputting the first frame image data from the first memory by the image output device.

23. An image output method suitable for an image output device, wherein the image output device is coupled to a first signal source and a second signal source, the image output device comprises a plurality of memories, and the image output method comprises:

determining a working state of the first signal source by the image output device;

choosing a first frame image data transmitted by the first signal source or the first frame image data transmitted by the second signal source by the image output device according to the working state of the first signal source, wherein a first memory in the plurality of memories stores the first frame image data transmitted by the first signal source or the first frame image data transmitted by the second signal source chosen by the image output device;

outputting the first frame image data from the first memory by the image output device;

designating one of the plurality of memories as a designated memory in sequence according to a storage order to perform a store-in or read-out to the designated memory, wherein the storage order is determined according to a usage status of the plurality of memories; and unpacking and performing digital signal processing on a read frame image data.

* * * * *